United States Patent [19]

Auracher et al.

[11] 4,204,310

[45] May 27, 1980

[54] PROCESS FOR PRODUCING A DEVICE FOR COUPLING TWO LIGHT CONDUCTING FIBER CABLES

[75] Inventors: Franz Auracher; Karl-Heinz Zeitler; Walter Rauscher, all of Munich, Fed. Rep. of Germany

[73] Assignee: Siemens Aktiengesellschaft, Berlin & Munich, Fed. Rep. of Germany

[21] Appl. No.: 882,261

[22] Filed: Feb. 28, 1978

Related U.S. Application Data

[62] Division of Ser. No. 688,716, May 21, 1976, Pat. No. 4,111,522.

[30] Foreign Application Priority Data

May 22, 1975 [DE] Fed. Rep. of Germany ....... 2522740

[51] Int. Cl.$^2$ .............................................. B23P 9/00
[52] U.S. Cl. ...................................... 29/445; 29/458; 29/464; 29/469
[58] Field of Search ................. 29/458, 445, 464, 469; 350/96.21, 96.22

[56] References Cited

U.S. PATENT DOCUMENTS

| | | | |
|---|---|---|---|
| 3,864,018 | 2/1975 | Miller | 350/96.21 |
| 3,912,574 | 10/1975 | Cherin et al. | 350/96.21 |
| 3,917,383 | 11/1975 | Cook et al. | 350/96.22 |
| 3,984,172 | 10/1976 | Miller | 350/96.21 |

*Primary Examiner*—Charlie T. Moon

*Attorney, Agent, or Firm*—Hill, Van Santen, Steadman, Chiara & Simpson

[57] ABSTRACT

A device for coupling an incoming light conducting fiber cable to an outgoing light conducting fiber cable characterized by at least one housing and means secured in the housing for holding the end faces of the light conducting fibers of each cable in centered relationship to each other and for optically interconnecting the ends faces of the light conducting fibers of the incoming cable to the end faces of the light conducting fibers of the outgoing cable. The means includes at least one holder having a guide body with guide channels for the light conducting fibers extending inward from one surface of the body and a cover member disposed on the guide body to close off the guide channels so that the light guiding fibers disposed in the channels are held therein. The guide body of each channel is preferably produced by a series of production steps while in a flat state either by mechanically forming the grooves, depositing material to form the grooves or developing a layer of material by a photolithographic process. Subsequent to forming the grooves, the guide body may be wound and secured on a cylindrical substrate so that the channels are disposed on a curved surface. The device may have a single holder to form a non-detachable connecting device, a pair of holders which are secured in an aligned position and form a detachable coupling device or a pair of holders mounted for relative rotation to form an optical switch.

6 Claims, 7 Drawing Figures

PROCESS FOR PRODUCING A DEVICE FOR COUPLING TWO LIGHT CONDUCTING FIBER CABLES

CROSS-REFERENCE TO RELATED APPLICATION

This application is a division of application, Ser. No. 688,716, filed May 21, 1976 which issued as U.S. Pat. No. 4,111,522 on Sept. 5, 1978.

BACKGROUND OF THE INVENTION

1. Field of the Invention

The present invention is directed to a device and method for making the device for coupling an incoming light conducting fiber cable to an outgoing light conducting fiber cable wherein the light conducting fibers are centered in relation to one another by two adjoining holders.

2. Prior Art

Previously known plug connections for light conducting fiber cables generally employed guides provided with funnel-shaped openings for the light conducting fibers. The fibers are introduced into the funnel-shaped openings until they come into mechanical contact with the associated parts as the parts are interconnected.

With every plug-in process, each fiber is subjected to mechanical stress. Also, it is difficult to clean the plug connection and a danger exists that when the fibers are introduced into the guides, dust is displaced onto the end faces of the fibers. In addition, it is difficult to produce by a mass production process the funnel-shaped guides with the required tolerance.

SUMMARY OF THE INVENTION

The present invention is directed to providing a device for coupling light conducting fiber cables in which the individual fibers of each cable are held fast in a precision holder and which device can be manufactured in a reproducible fashion by mass production techniques.

To accomplish these tasks, the present invention provides a device for coupling an incoming light conducting fiber cable to an outgoing light conducting fiber cable, said device comprising at least one housing, and means secured in the housing for holding the end faces of the light conducting fibers of each cable in a centered relationship to each other and for optically interconnecting the end faces of the light conducting fibers of the incoming cable to the end faces of the light conducting fibers of the outgoing cable, said means including at least one holder having a guide body with guide channels for the light conducting fibers extending inward from a first or one surface of the body, and a cover member disposed on the guide body to close off the guide channels so that the light guiding fibers disposed in the channels are held therein.

In one embodiment of the invention, the device includes a single holder with the guide channels of the guide body receiving the free ends of the fibers of the two cables with the end faces of the fibers in contact with each other for optically interconnecting the fibers of the one cable to the other cable so that the device is a non-detachable coupling device.

In a second embodiment of the invention, the device has a pair of holders with the end faces of the fibers disposed in each of the channels of each of the guide bodies of each holder being in the plane of the end surface of the holder so that detachable connecting of the holders with their end faces in contact place the end faces of the fibers of one cable in direct contact with the end faces of the fibers of the other cable to optically interconnect the ends of the fibers of the two cables.

In a third embodiment, the guide body is a curved member with the one surface being curved at a right angle to the axis of the fiber. Preferably, the holder includes a disk-shaped substrate having a cylindrical surface with the guide body being disposed on the cylindrical surface and the cover member being an annular body. Preferably, the substrate is provided with an axially disposed centering hole which receives a pin so that a pair of holders may be rotated relative to each other to enable selective switching of the connection between one group of fibers in one holder with different groups of fibers in the other holder.

If desired, the optical interconnection between the faces of the fibers can be accomplished by arranging the holders in spaced relationship with an optical system disposed therebetween so that the light signals are transmitted from the end faces of the fibers of one cable are focused on the end faces of the fibers of the other cable.

In each of the above embodiments, the guide channels preferably have a cross section with an undercut profile so that the width of the channel increases as the distance from the one surface increases so that the width at the bottom of each channel is greater than that width at the one surface.

In each of the embodiments, the guide body and the cover member of each holder at the ends of each channel are provided with chamfered portions so that damage of the fibers due to bending is minimized.

The method of the present invention is for producing a device for coupling two light connecting fiber cables together with the device having a separate holder for each cable secured in a housing, the method comprises providing a blank for a guide body for each holder, supporting each blank with a surface lying in a flat plane, forming guide channels in the surface of the blank to form a guide body having one surface with channels extending inward from the one surface, inserting the light conducting fibers in the channels of the guide bodies with the end faces of the fibers adjacent an end surface of the guide body, applying a cover member on each guide body to form each holder, grinding and polishing the end surfaces of each holder so that the end faces of the light conducting fibers lie in the plane of the end surface of the holder, securing the holders in the housing with the fibers of one cable being centered relative to the fibers of the other cable. The steps of forming the channels may comprise mechanically forming the channels in the surface of each blank, electrode-positing material on selected portions of the surface of the blank, or providing a blank having a photosensitive layer on the surface and processing the layer photolithographically. Preferably, to form the embodiment having a guide body with a curved surface disposed on a cylindrical surface of a substrate, the guide body is formed while in a flat condition and prior to the step of inserting or assemblying the fibers in the channel, the guide body is wrapped on the cylindrical surface of the disk and secured thereto so that the channels are disposed on a curved surface.

The method of the present invention enables producing the device in a series of production steps which steps can be easily accomplished due to producing the guide body while in a flat condition and finishing the end faces of the fibers after they are secured in the channels of the guide bodies.

DESCRIPTION OF THE PREFERRED EMBODIMENTS

Figure 1:
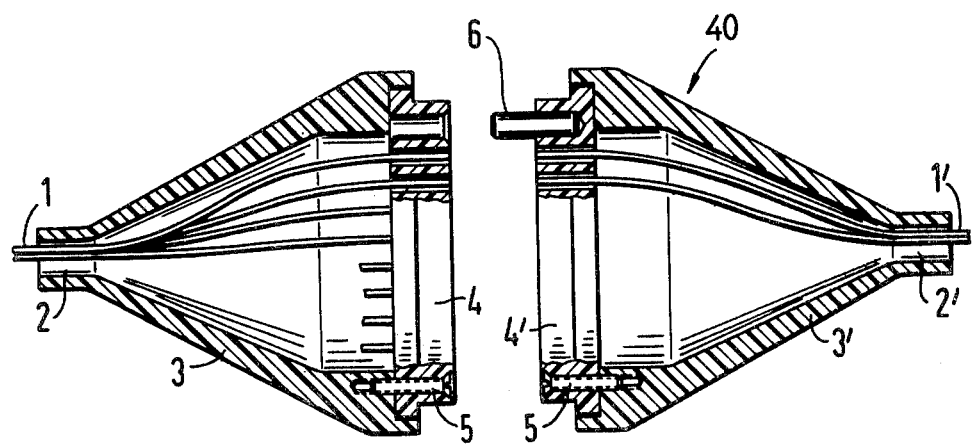
FIG. 1 is a cross-sectional view with portions in elevation for purposes of illustration of a device for coupling in accordance with the present invention.

The principles of the present invention are particularly useful when incorporated in a device, which is generally indicated at 40 in FIG. 1 for interconnecting or coupling the fiber ends of a light conducting fiber cable 1 to the fiber ends of a light conducting fiber cable 1'.

As illustrated, the device 40 comprises a pair of housing 3 and 3' which have openings 2 and 2', respectively. The cables 1 and 1' are inserted through the openings and the individual fiber ends are secured in channels in holders 4 and 4', which are mounted and secured in the housing 3 and 3' by fasteners such as screws 5. The housings 3 and 3' are connected together by at least one centering pin 6 in such a manner that the end faces of the light conducting fibers which are to be connected together touch one another. The holders 4 and 4' position the light conducting fibers which are to be connected with a dimensional accuracy which amounts to a fraction of the fiber diameter. To prevent thermal expansion of the individual components of the device from leading to undesirable displacement of the axis of each fiber, these individual components consist of materials which have a low coefficient of thermal expansion for example a dielectric material e.g. glass or a stainless steel.

Figure 2:
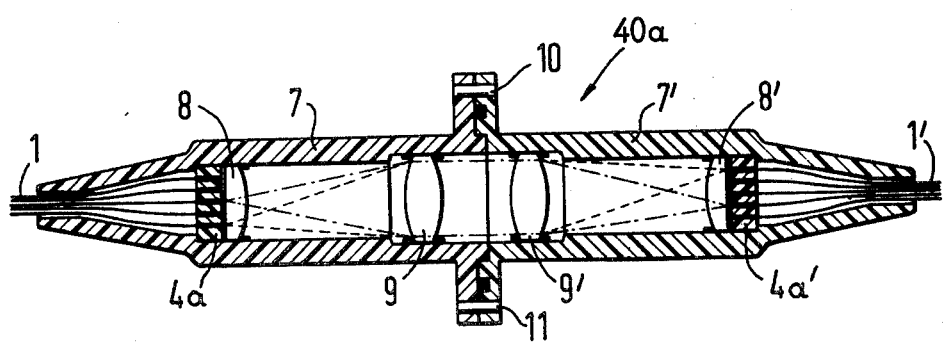
FIG. 2 is a cross-sectional view with portions in elevation for purposes of illustration of an embodiment of the coupling device in accordance with the present invention.

An embodiment of the device for interconnecting or coupling light conducting fiber cables 1 and 1' is generally indicated at 40a in FIG. 2. In the device 40a, the individual light conducting fiber for the cables 1 and 1' are coupled or connected together by an optical system. As illustrated, the device 40a includes a pair of housings 7 and 7' which receive holders 4a and 4a' which holders have the end faces or end surfaces of the fibers of the respective cables 1 and 1' disposed on a plane surface.

The optical system comprises a pair of field lenses 8 and 8' and a pair of focusing lenses 9 and 9'. The field lenses 8 and 8' are disposed in the housings 7 and 7' in front of the end faces or surfaces of the light conducting fibers secured in the holders 4a and 4a'. The focusing lenses 9 and 9' are received in the housings 7 and 7' in spaced relation to the field lenses 8 and 8' and focus the optical signals of each fiber of a fiber group such as 1 precisely onto the end faces of the opposite located fibers of the fiber group 1'. As illustrated, the housings 7 and 7' are detachably secured together by connecting pins 10 and 11.

The device 40a which uses an optical system comprising a lens system for interconnecting the signal from one fiber cable 1 to fiber cable 1' has an advantage that by selection of the lenses and the distance between the oppositely located fiber ends in the holders 4a and 4a', it is possible to connect cables having different fiber diameters. In addition, the coupling efficiency is less sensitive to dust as the light signals which are to be coupled from each fiber are distributed over the entire lens surfaces of the lenses 9 in FIG. 2.

Figure 4:
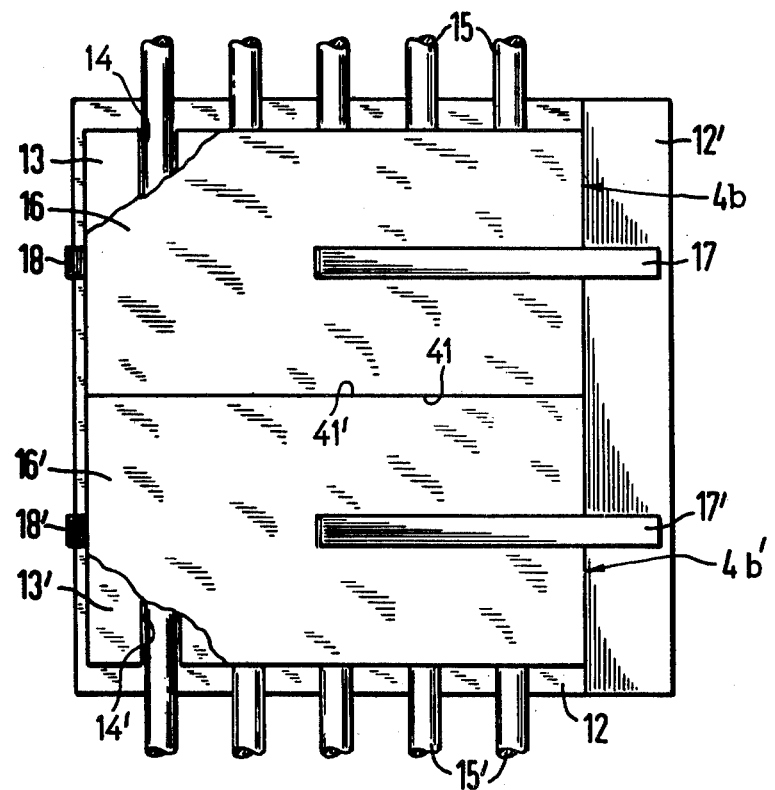
FIG. 4 is a plan view of the holder illustrated in FIG. 3.

As illustrated in FIG. 4, each of the holders 4b and 4b' are supported on a support plate or guide plate 12 which has a lateral guide bar 12'. The guide bar 12' has a pair of resilient means such as springs 17 and 17' and the support plate 12 on an edge opposite the guide bar 12' is provided with a pair of resilient means such as springs 18 and 18'. The springs 17, 17', 18 and 18' resiliently urge or press each of the holders 4b and 4b' onto the support plate 12 and laterally against the guide bar 12'. Thus, both of the holders 4b and 4b' are held precisely in a normal position with respect to one another so that the ends of the light conducting fibers, which are to be coupled together, will precisely abut one another. Due to the resilient urging or pressing, the holders 4b and 4b' either together or separately may be detached from a coupling position at any time as the need arises.

Each of the holders 4b and 4b' has a flat guide member which is illustrated as formed of the substrate 120 on which guide strips 13 or 13' are disposed in a parallel relationship. The positioning of the guide strips 13 on the substrate 120 for each holder 4b and 4b' provide guide channels 14 and 14', respectively. As illustrated, each of the guide strips 13 and 13' is of a synthetic material, which is elastic in nature, and each of the guide channels 14 and 14' has an undercut profile. Due to elasticity of the material of the guide strips, light conducting fibers 15 and 15' may be easily inserted in the channels 14 and 14', respectively, and are held therein in a stable position. If necessary, an adhesive may be utilized to ensure the attachment of the respective fibers 15 and 15' in their respective channels 14 and 14'. Cover members 16 and 16' are then assembled onto the guide member and bonded therewith such as by utilizing a suitable adhesive.

When assemblying the fibers such as 15 and 15' in their respective holders such as 4b or 4b', the end surfaces of the fibers are arranged to lie in the plane of the end surfaces 41 and 41' of the respective holder. If necessary, the end surfaces 41 and 41' along with the end faces of the respective fibers 15 and 15' may be processed such as by flat grinding and polishing. Thus, when the holders 4b and 4b' are assembled on the support 12 with the end surfaces 41 and 41' in contact the end faces of the fibers 15 and 15' are in contact with each other.

Figure 5:
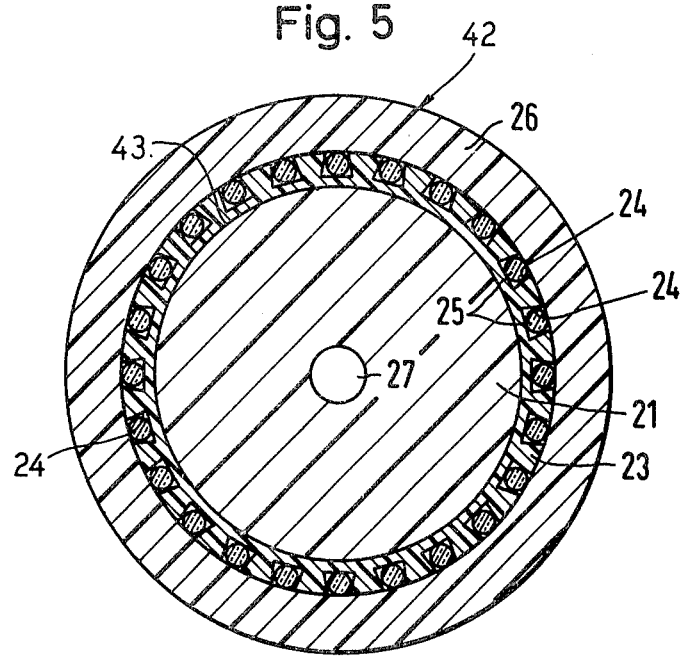
FIG. 5 is a cross-sectional view of another embodiment of the holder of the present invention which embodiment can be used for switching one group of fibers between individual groups of light conducting fibers.

In FIG. 5 an embodiment of the holder is generally indicated at 42. The holder 42 has a ring-shaped guide body 23 which is mounted and firmly secured on a cylindrical surface 43 of a disk-shaped substrate 21. The guide body 23 has a plurality of guide channels 24 which will receive the light conducting fibers 25. As illustrated, each of the channels 24 has an undercut profile with the width adjacent the bottom of each channel greater than the width adjacent the one surface of the guide body. After securing the light conducting fibers 25 in respective channels 24, a cover member, which is illustrated as an annular body 26, is assembled on the guide body 23 and secured thereto.

The substrate 21 is preferably provided with an axially disposed aperture receiving a centering pin 27. When the holder 42 is rotated on the centering pin, each of the fibers 25, which are secured in the channels 24, will move in an annular zone of a given radius. By assemblying two holders 42 together with a single centering pin 27, relative rotation between the two holders will enable the light conducting fibers 25 of one of the holders 42 to be consecutively coupled to light conductive fibers in the other holder. By providing a suitable locking device (not illustrated) the desired selective positions of one holder relative to the other holder can be achieved so that the device functions as an optical switch that allows the switching of connections between the fibers of one holder with the fibers of another holder.

Figure 6:
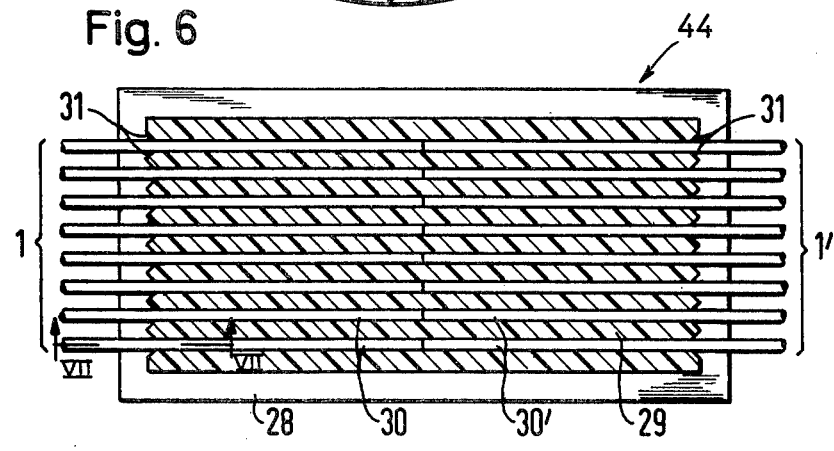
FIG. 6 is a plan view of an embodiment of the holder of the present invention without the cover member.
Figure 7:
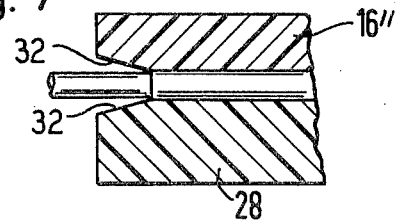
FIG. 7 is a partial cross-sectional view taken along lines VII—VII of FIG. 6.

An embodiment of a holder is generally indicated at 44 in FIGS. 6 and 7. The holder 44 is used to form a non-detachable connection for a device for interconnecting the fibers 30 of a group or cable 1 to the fibers 30' of a group or cable 1'.

As illustrated, the holder 44 has a guide body formed by a substrate 28 which has a plurality of parallel guiding portions 29 to form guide channels that extend parallel to each other. In this embodiment, the free ends of the light conducting fibers 30 of the cable or group 1 as well as the free ends of the light conducting fibers 30' of the group or cable 1' have their end faces properly polished into a flat configuration. The fibers 30 and 30' are disposed in the channels formed by the guiding portions 29 with their end faces in direct contact with each other. Subsequent to placing the fibers 30 and 30' in the channels, a cover member such as a plate 16" (FIG. 7) is secured on the guide body to complete a permanent non-detachable connection.

In order to avoid sharp kinks in the fibers due to bending, the portions 29 adjacent the end of each of the ends of the channel possesses a funnel-shaped end zone 31 which may be produced by a chamfer. In a similar manner, the end zones of both the cover member 16" and the substrate 28 are provided with a chamfer 32 as illustrated in FIG. 7. It should be noted that each of the previously described holders may be provided with the chamfer adjacent each end of each channel to minimize damage to the fiber due to bending.

In the devices 40 and 40a (FIGS. 1 and 2), the holders 4 and 4a have a disk-shaped configuration similar to the holder 42. With minor modifications of either of the housings 3 or 7, a holder such as 4b, which has a rectangular cross-sectional configuration and which holds the fibers in a flat plane, can be utilized in the devices 40 or 40a.

In manufacturing each of the holders, a blank for a guide body of the holder is provided and processed in a series of production steps. The steps include supporting each of the blanks with the surface lying in a flat plane, forming guide channels in the surface of the blank to form a guide body having one surface with channels extending inward therefrom, subsequently inserting the light conducting fibers into the channel of the guide body, applying a cover member on each guide body to form each holder. If the holder is for a non-detachable device, the light conducting fibers have the end faces polished and the fibers of each group are inserted or assembled in the channels with the end faces in contact.

If the holder has a curved guide body such as 23 of holder 42, the channels are formed while the blank is supported in a flat plane and then the guide body is wrapped on the cylindrical surface 43 of disk-shaped substrate 21 and secured thereto prior to inserting the fibers. For holders such as 4b and 42, the end faces of the fibers are arranged at the plane of the end surface such as 41 and then after applying the cover member, the end face as well as the end surface are processed by grinding and polishing the end surfaces of each holder so that the end faces of the light conducting fibers lie in a plane of the end surface. Then the holder is subsequently secured in its housing with the fibers of one cable being centered relative to the fibers of the other cable.

Figure 3:
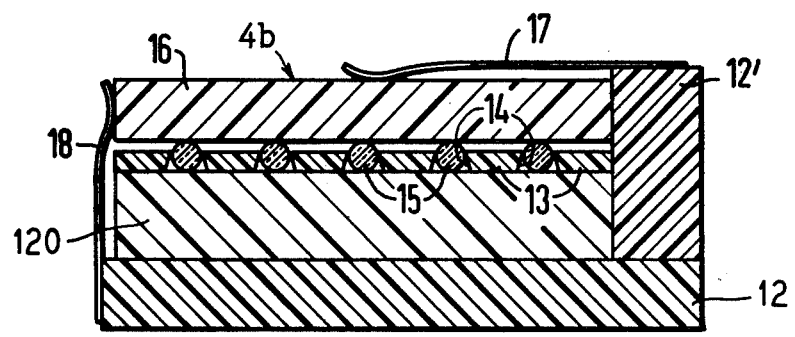
FIG. 3 is a cross-sectional view with portions in elevation for purposes of illustration of one embodiment of the holder in accordance with the present invention.

By utilizing a series of production steps and by operating on substantially flat parallelepiped-shaped substrate, the step of forming the channels can be by mechanically forming the channels in the blank, by depositing material on a surface of the blank in the desired areas such as by electrodepositing or electroplating, or the blank can be provided with a layer of photosensitive material which is processed photolithographically to form the strips such as 13 in FIG. 3.

Although various minor modifications may be suggested by those versed in the art, it should be understood that we wish to employ within the scope of the patent granted hereon, all such modifications as reasonably and properly come within the scope of our contribution to the art.

We claim:

1. A method of producing a device for coupling light conducting fiber cables together, said device having a single holder for the fibers of the cables, said method comprising providing a blank for a guide body for the holder, supporting the blank with a surface lying in a flat plane, forming guide channels in the surface of the blank to form a guide body having one surface with channels extending inward therefrom, each channel having an undercut profile with the width adjacent the bottom of each channel being greater than the width at the one surface, inserting the light conducting fibers of each cable into their respective channels with the end faces of the fibers of one cable in contact with the end faces of the fiber of the other cable, and applying a cover member on the guide body to form the holder.

2. A method according to claim 1, which includes forming chamfered portions on the guide body and cover member adjacent each end of each guide channel prior to the step of inserting the fibers.

3. A method for producing a device for coupling two light conducting fiber cables together, said device having a separate holder for each cable secured in a housing, said method comprising providing a blank for a guide body for each holder, supporting each blank with a surface lying in a flat plane, forming guide channels in the surface of the blank to form a guide body having one surface with channels extending inward therefrom, wrapping the guide body on a cylindrical surface of a disk, securing the wrapped guide body to the cylindrical surface so that the channels are on a curved surface, subsequently inserting light conducting fibers in the channels of each of the guide bodies with the end faces of the fibers adjacent one end surface of the guide body, applying a cover member on each guide body to secure the fibers in said channels to form each holder, grinding and polishing the end surface of each holder and the end faces of the fibers so that the end faces of the light conducting fibers lie in the plane of the end surface, and securing the holders in a housing with the fibers of one cable being centered relative to the fibers of the other cable.

4. A method according to claim 3, wherein said step of forming guide channels comprises forming each guide channel with an undercut profile with the width of the channel at the bottom being greater than the width of the channel adjacent the one surface.

5. A method for producing a device for coupling two light conducting fiber cables together, said device having a separate holder for each cable secured in a housing, said method comprising providing a blank for a guide body for each holder, supporting each blank with a surface lying in a flat plane, forming guide channels in the surface of the blank to form a guide body having one surface with channels extending inward therefrom by forming each guide channel with an undercut profile with the width of the channel at the bottom of each channel being greater than the width of the channel at said one surface, subsequently inserting light conducting fibers in the channels of each of the guide bodies with the end faces of the fibers adjacent one end surface of the guide body, applying a cover member on each guide body to secure the fibers in said channels to form each holder, grinding and polishing the end surface of each holder and the end faces of the fibers so that the end faces of the light conducting fibers lie in the plane of the end surface, and securing the holders in a housing with the fibers of one cable being centered relative to the fibers of the other cable.

6. A method according to claim 5, which includes forming a chamfered portion on the guide body and cover adjacent each end of each channel.

* * * * *